United States Patent [19]

Daniel

[11] Patent Number: 4,847,750
[45] Date of Patent: Jul. 11, 1989

[54] PERIPHERAL DMA CONTROLLER FOR DATA ACQUISITION SYSTEM

[75] Inventor: Richard A. Daniel, Tucson, Ariz.

[73] Assignee: Intelligent Instrumentation, Inc., Tucson, Ariz.

[21] Appl. No.: 829,408

[22] Filed: Feb. 13, 1986

[51] Int. Cl.[4] ............................................. G06F 13/00
[52] U.S. Cl. ............................... 364/200; 364/242.31; 364/244.8
[58] Field of Search ........ 364/200, 900, 200 MS File, 364/900 MS File

[56] References Cited

U.S. PATENT DOCUMENTS

| | | | |
|---|---|---|---|
| 4,067,059 | 1/1978 | Derchak | 364/200 |
| 4,075,691 | 2/1978 | Davis et al. | 364/200 |
| 4,163,280 | 7/1979 | Mori et al. | 364/200 |
| 4,164,786 | 8/1979 | Gollomp | 364/200 |
| 4,271,466 | 6/1981 | Yamamoto et al. | 364/200 |
| 4,283,760 | 8/1981 | Kita et al. | 364/200 |
| 4,346,439 | 8/1982 | Huno et al. | 364/200 |
| 4,400,772 | 8/1983 | Broyles et al. | 364/200 |
| 4,455,620 | 6/1984 | Watanabe et al. | 364/900 |
| 4,482,951 | 11/1984 | Swaney et al. | 364/200 |
| 4,530,053 | 7/1985 | Kriz et al. | 364/200 |
| 4,538,224 | 8/1985 | Peterson | 364/200 |
| 4,591,973 | 5/1986 | Ferris et al. | 364/200 |
| 4,658,350 | 4/1987 | Eggebrecht et al. | 364/200 |

OTHER PUBLICATIONS

Intel Microprocessor and Peripheral Handbook, 1983, pp. 2-103 to 2-119, "Programmable DMA Controller".
IBM T.D.B. vol. 17, No. 7, Dec. 1974, pp. 2082-2085, by M. N. Cianciosi and K. K. Slack entitled Cycle Steal-Scatter Read or Write.

Primary Examiner—Eddie P. Chan
Assistant Examiner—Paul Kulik
Attorney, Agent, or Firm—Cahill, Sutton & Thomas

[57] ABSTRACT

A peripheral DMA (direct memory access) system having a computer with an internal DMA controller and only one channel available for external DMA operations includes: a peripheral DMA controller coupled between the computer address bus and a peripheral address bus, and also between the computer data bus and a peripheral data bus. The peripheral DMA controller includes a dual port "frame map memory" in which addresses of various peripheral devices are sequentially stored prior to initiating a DMA operation wherein data is rapidly transferred from various peripheral devices having nonsequential addresses to sequential locations of the computer memory or vice versa.

22 Claims, 6 Drawing Sheets

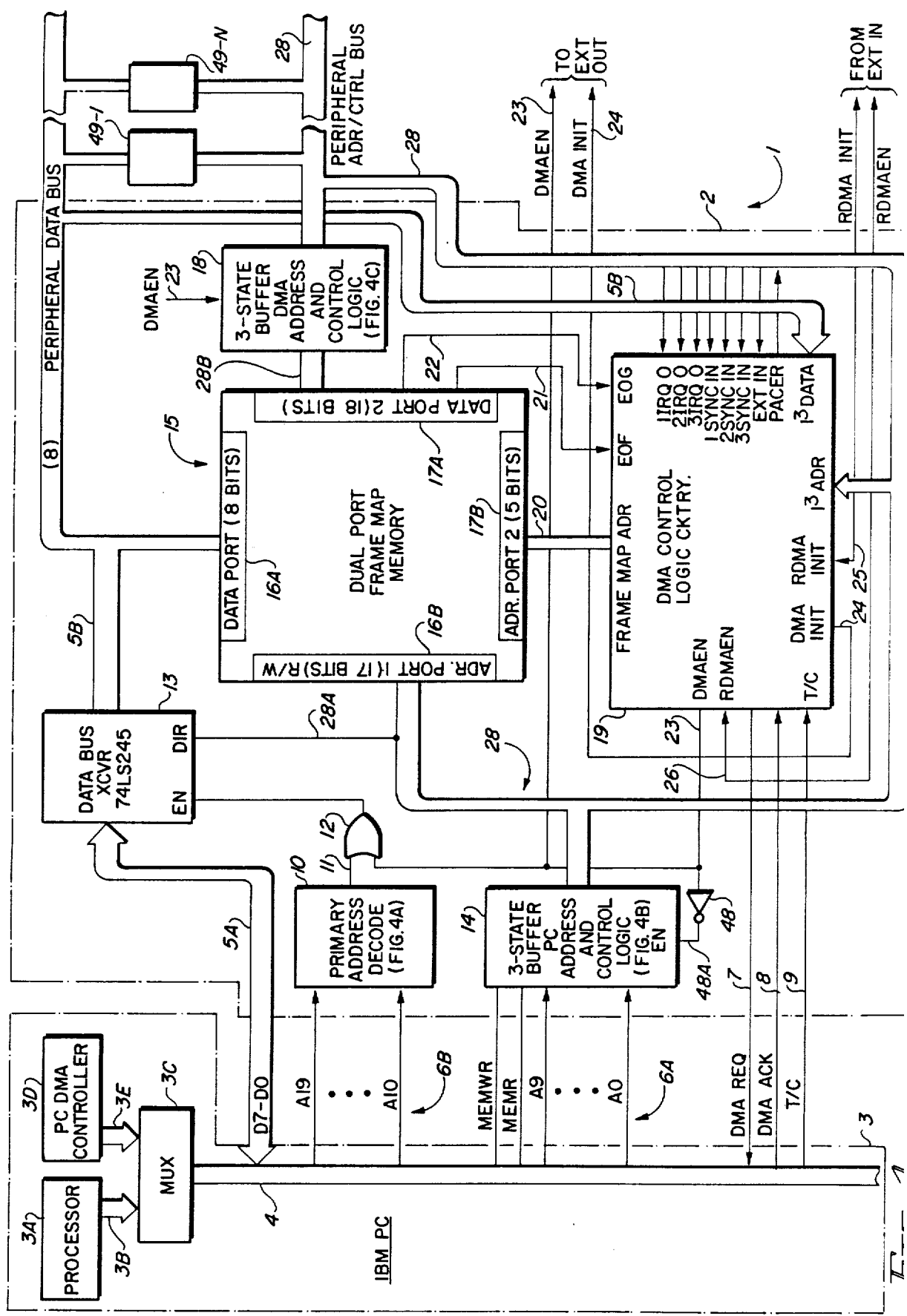

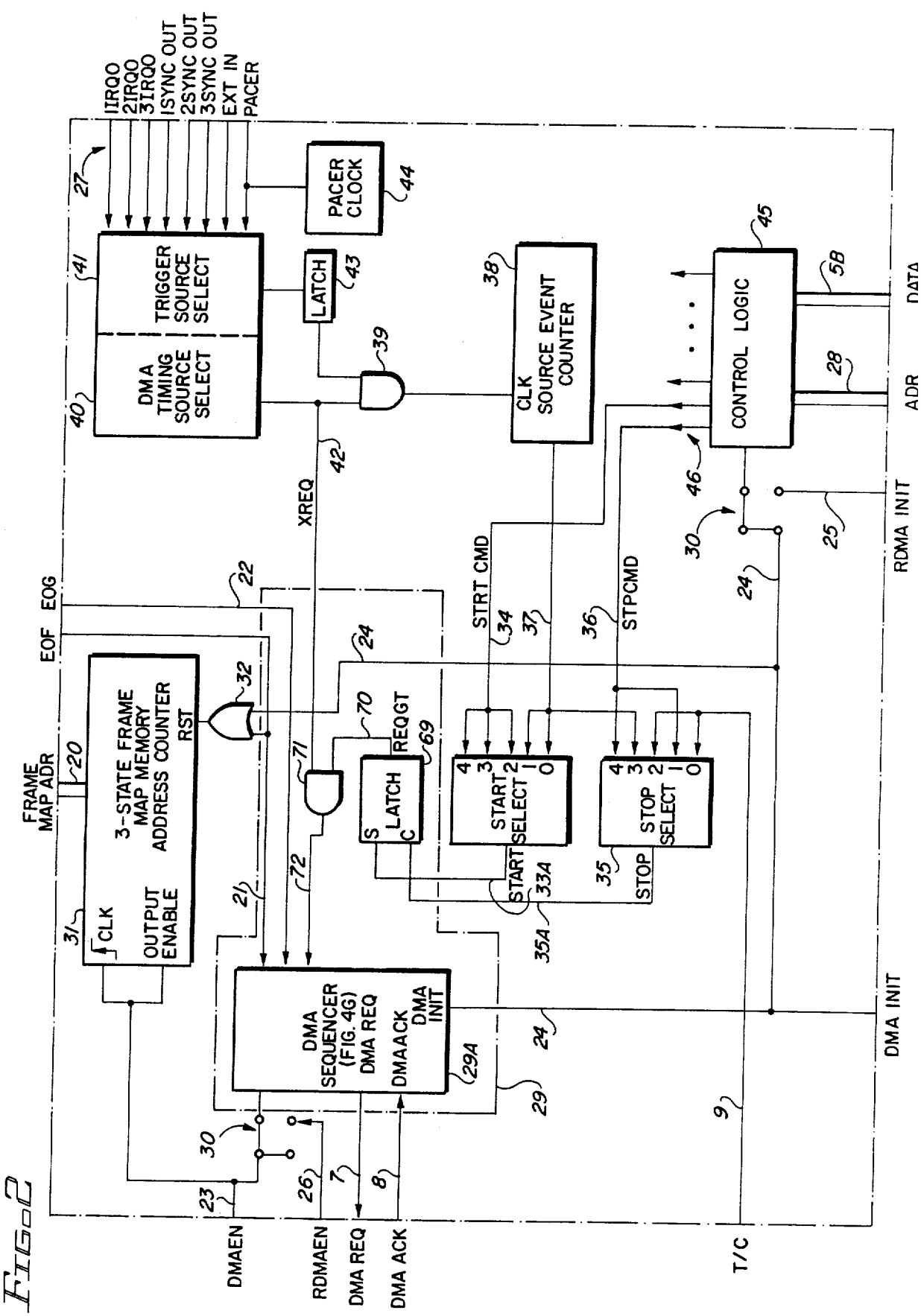

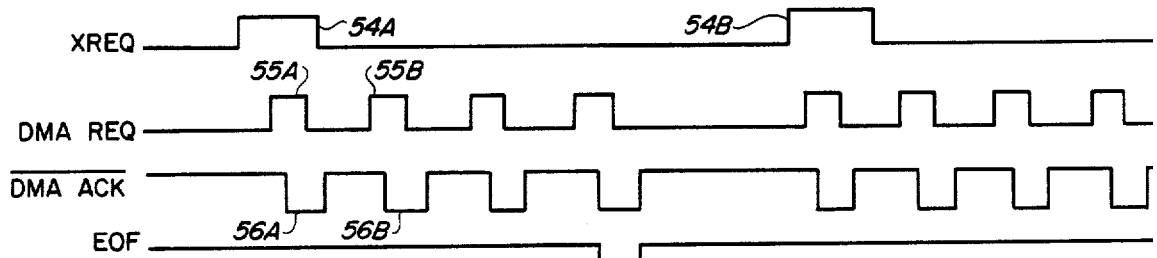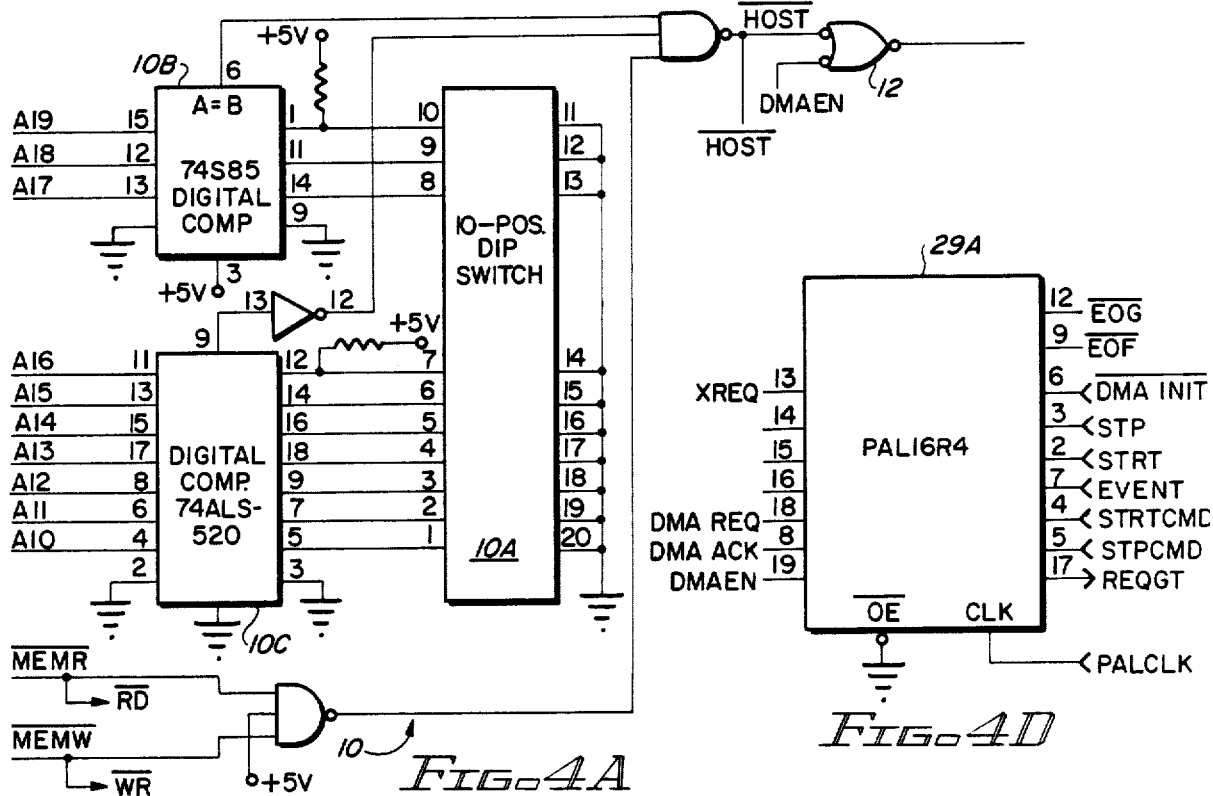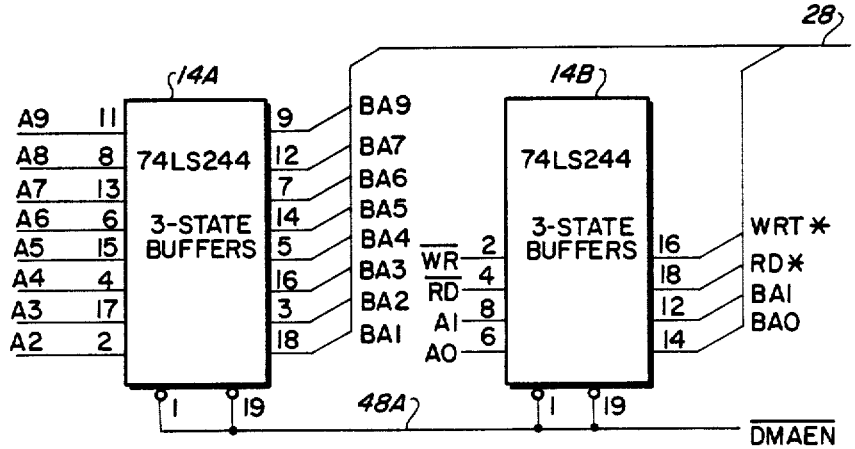

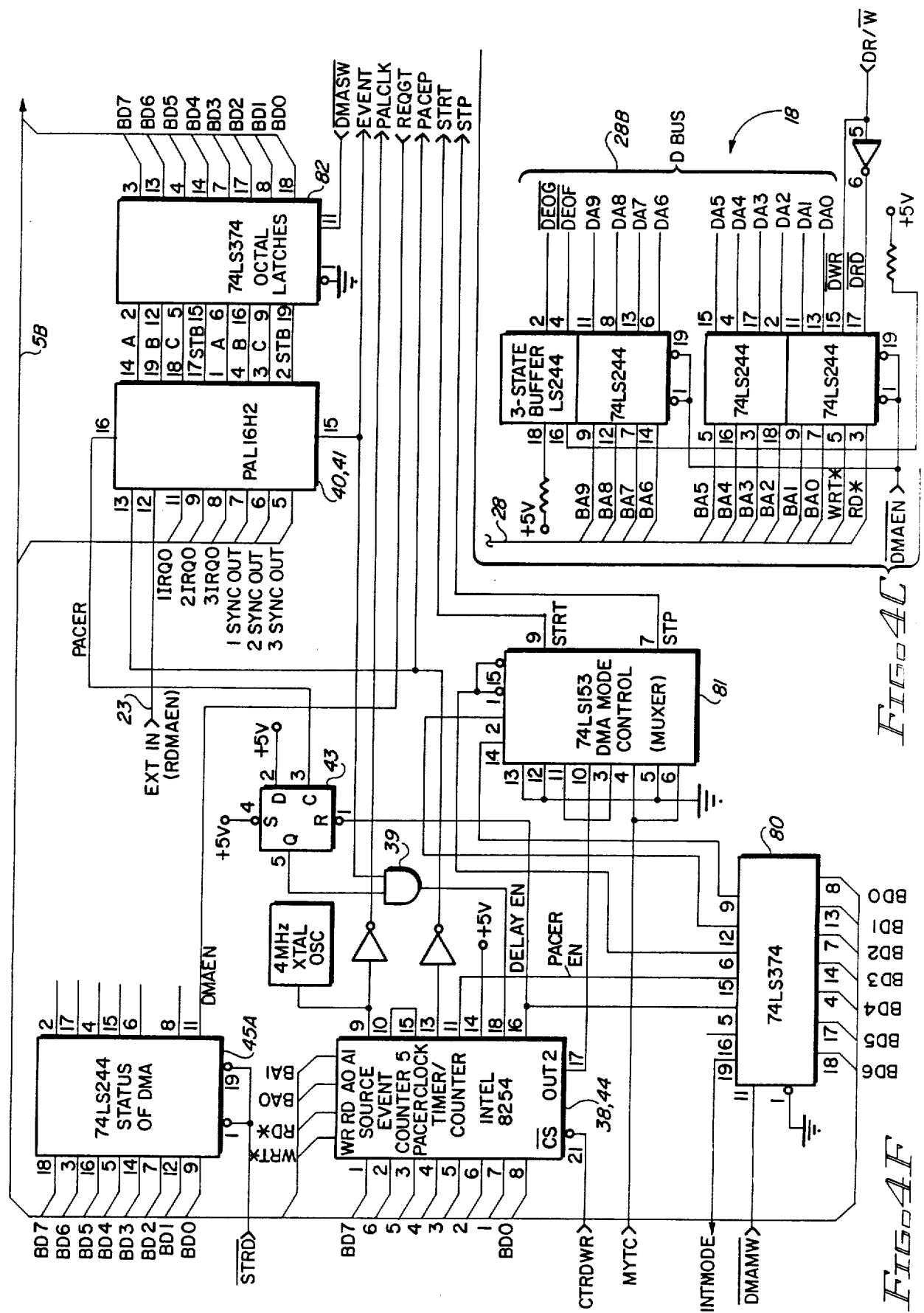

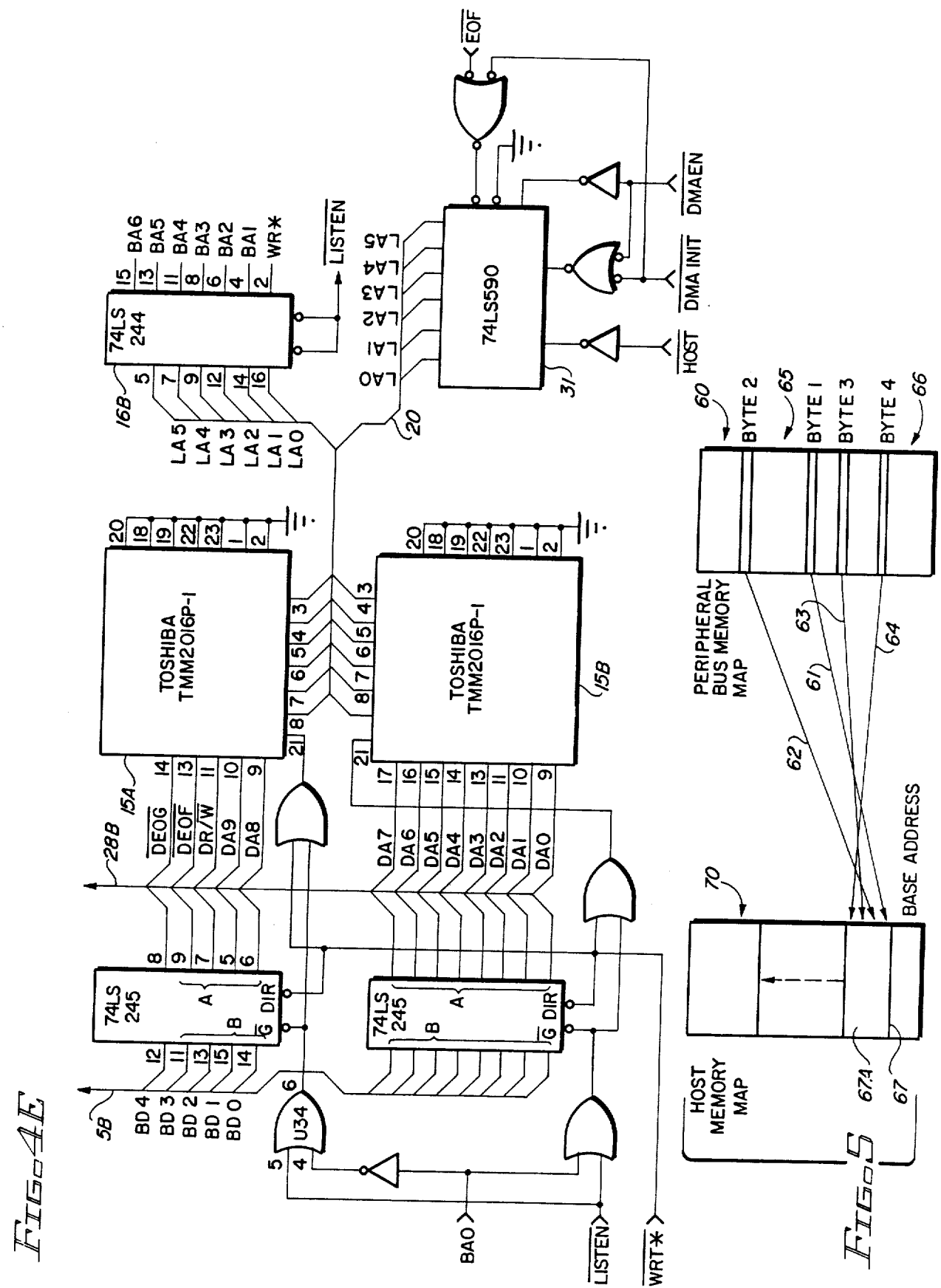

PERIPHERAL DMA CONTROLLER FOR DATA ACQUISITION SYSTEM

BACKGROUND OF THE INVENTION

The invention relates to apparatus and techniques for accomplishing DMA (direct memory access) operations in computer systems, especially data acquisition systems connected to a large number of peripheral devices, and more particularly, to a unique peripheral DMA controller system to be used in conjunction with a computer collecting and operating upon data from a large number of peripheral devices.

By way of background, a brief description of DMA will be given. User programs can be written to enable a computer to access memory locations. The memory locations can be locations of a computer's internal memory or locations of external memories, such as hard disks, floppy disks, keyboards, and any of a large number of other kinds of peripheral devices such as analog-to-digital converters, digital-to-analog converters, interface adapters, etc., each of which has at least one address by means of which it can be addressed. In many instances, it is highly undesirable to require the computer programmer to keep track of all memory locations and all memory transfers. Memory access that it controlled and kept track of by the computer programmer can be referred to as programmed memory access. The programmed computer generates the addresses on an address bus that is coupled to the addressed peripheral device or memory. Often, however, it may be very convenient for an external or peripheral device to be able to completely, almost automatically effectuate a transfer of information from its own storage location to another storage location, such as the computer memory, in such a manner that the user program need not attend to the details of the information transfer. The technique by which such transfers of information are accomplished is referred to as DMA or direct memory access.

Direct memory access techniques commonly are used in data acquisition systems wherein a large number of sequential locations are to be transferred from one memory to another or from one group of non-sequential locations to another group of sequential memory locations of a computer. Typically, in data acquisition systems, one and only one analog-to-digital converter is operated under DMA control to scan a list of analog channels. Prior DMA techniques have not been adequate where there are a large number of peripheral devices with different, nonsequential addresses, because the DMA controller effectuating DMA operations would require a separate channel for each such peripheral device. Providing such multi-channel DMA controllers, one for each peripheral device, would be prohibitively expensive. In the past, most data acquisition systems of the type requiring collection of data from a large number of peripheral devices having nonsequential addresses has been accomplished by polling techniques or by interrupt techniques. Polling techniques have the advantages of simplicity of hardware and software and relatively high operating speed, but are subject to the disadvantage that the collected data is subject to "jitter", i.e., uncertainty as to exactly when the polled events occurred. Such uncertainty in turn may lead to significant errors that are very difficult to detect and correct. Polling techniques make "background operation" very difficult. ("Background operation" is the utilization of the computer to accomplish the data acquisition in a manner that is nearly "invisible" to the operating program.) Polling techniques usually require that a particular computer be "dedicated" to the data acquisition task. This often is unsatisfactory, because it usually would be advantageous to simultaneously use the computer for other functions in addition to the data acquisition functions. Interrupt-based data acquisition techniques generally are slower than polling techniques, due to the "overhead" software and time required for each interrupt operation. Interrupt techniques may cause considerable difficulty with bus contention problems if there are a lot of peripheral devices that are capable of generating interrupts connected to this system. Interrupt-based data acquisition systems also usually require that a computer be dedicated to the data acquisition function.

The overall situation is that until now, there has been no highly satisfactory technique for effectuating stable, high speed, economical, essentially "invisible" acquisition of data from a large number of peripheral devices having nonsequential addresses without encountering the various above-mentioned difficulties.

SUMMARY OF THE INVENTION

Accordingly, it is a primary object of the invention to provide a peripheral DMA controller system that permits relatively inexpensive, convenient transfer of data into a large number of sequential memory locations from a large number of peripheral devices having nonsequential addresses.

It is another object of the invention to provide an inexpensive, high speed "device-to-memory" DMA apparatus and technique.

Briefly described, and in accordance with one embodiment thereof, the invention provides a peripheral DMA controller for connection to a processor having a data bus, an address bus, and an internal DMA controller having a DMA request input and a DMA acknowledge output, the peripheral DMA controller including a frame map memory for storing a plurality of non-consecutive addresses of various peripheral devices coupled to the data bus and circuitry for coupling and decoupling the address bus and the data bus to the frame map memory to allow the processor to load the non-consecutive addresses into consecutive addresses of the frame map memory. The peripheral DMA controller includes an address counter coupled to address inputs of the frame map memory and a sequencing circuit that generates a DMA request signal on the DMA request input of the internal DMA controller in response to a transaction request signal generated from a particular source. In the described embodiment of the invention, the frame map memory is a dual port memory. A DMA enable request generated by the sequencer in response to a DMA acknowledge signal received from the internal DMA controller couples the data bus to the peripheral data bus and also decouples the address bus from the dual port memory and the peripheral address bus, and enables the address counter to supply addresses to the dual port memory. After each peripheral device address in the frame map memory is output to the peripheral address bus, effectuating a DMA transfer of one byte of data, the internal DMA controller relinquishes control of the address bus and data bus over to the processor for one instruction cycle. Thus, DMA transfers of data from a large number of peripheral devices having non-sequential addresses into consecutive addresses of the processor memory, or vice versa are accomplished with a single channel of the internal peripheral DMA controller, and without requiring that the processor be dedicated to DMA transfer operations. In the described embodiment of the invention, a number of different modes of operation are allowed, selectable by programming internal timing source select circuitry and trigger source select circuitry.

BRIEF DESCRIPTION OF THE DRAWINGS

FIG. 1 is a schematic block diagram of a data acquisition system including the peripheral DMA controller of the present invention.

FIG. 2 is a block diagram of the internal DMA controller logic block of FIG. 1.

FIG. 3 is a timing diagram useful in describing the operation of the system of FIG. 1.

FIGS. 4A–4F are detailed circuit diagrams of the various blocks in FIGS. 1 and 2.

FIG. 5 is a memory map diagram useful in explaining operation of the invention.

DESCRIPTION OF THE INVENTION

Figure 6:
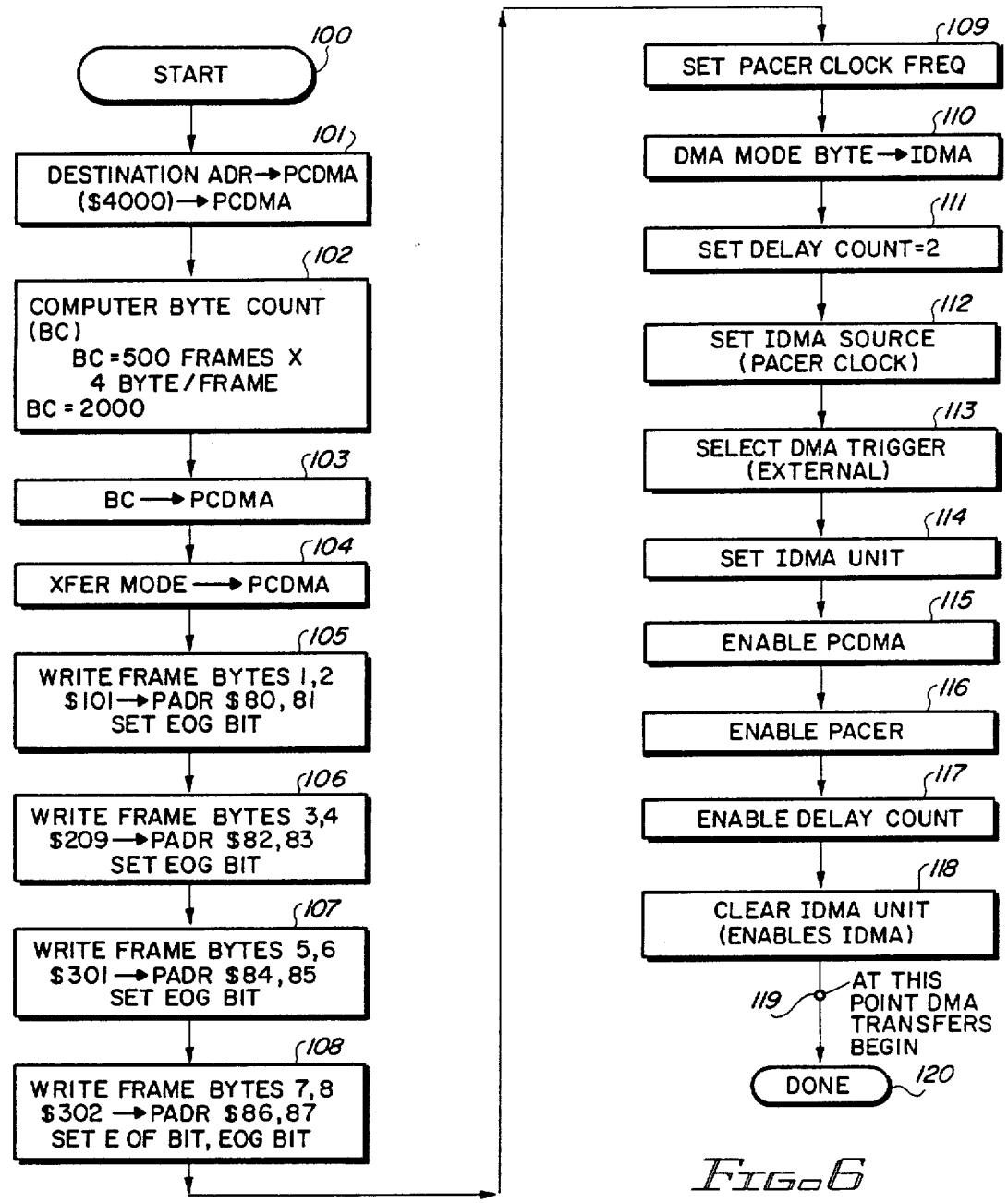
FIG. 6 constitutes a flow chart of the steps carried out by a program in the computer of FIG. 1 to set the system up to carry out a DMA operation by the peripheral DMA controller thereof.

Referring now to FIG. 1, data acquisition system 1 includes a peripheral DMA controller 2 coupled between the internal bus 4 of an IBM Personal Computer (PC) and a plurality of peripheral devices 49-1 ... 49-N that each are connected between a peripheral data bus 5B and a peripheral address/control bus 28. The peripheral devices 49-1, etc. typically include, in the described embodiment, up to 64 analog-to-digital converters, digital-to-analog converters, peripheral interface adaptors, or various other memory devices. In the described embodiment of the invention, peripheral DMA controller 2 is provided on a single printed circuit board that can be plugged into an empty slot provided in the IBM PC 3.

It should be noted that the IBM PC 3, also referred to as host computer 3, includes an internal processor 3A coupled by a bus 3B and "multiplexing" circuitry 3C to internal bus 4. The other set of inputs of "multiplexing" circuitry 3C is coupled by bus 3E to an internal DMA controller 3D of host computer 3. Multiplexing circuitry 3C is controlled in response to the operating program of host computer 3 to allow one or the other of processor 3A and internal DMA controller 3D to control the internal bus 4. Internal bus 4 includes a bidirectional internal data bus 5A having conductors D0–D7, 20 address conductors A0–A19, and various other control signals that are well known to those skilled in the art.

IBM PC 3 can be interrupted by a single interrupt signal that can be generated by any external source, such as any of the peripheral devices 49-1, etc.

Peripheral DMA controller 2 includes a primary address decoder circuit 10, the details of which are shown in FIG. 4A. Address decoder circuit 10 has its inputs coupled to address conductors A10–A19, which are designated collectively by reference numeral 6B. Address decoder circuit 10 produces a signal on conductor 11 that is input to an OR gate 12 to produce an enable signal that is applied to a data bus transceiver circuit 13. Data bus transceiver circuit 13 controllably couples the conductors of computer data bus 5A to corresponding conductors of bidirectional peripheral data bus 5B in the direction determined by the direction (Read/Write) signals on conductor 28A of peripheral address/control bus 28. Data bus transceiver 13 can be a conventional 74LS245 octal transceiver integrated circuit.

Computer address bus conductors A0–A9, collectively referred to by reference numeral 6A, a memory write signal MEMWR, and a memory read signal MEMR are applied as inputs to circuit 14, which includes three-state buffers, PC address, and control circuitry The address outputs of the three-state buffer circuitry in block 14, when enabled, produce signals on the conductors of peripheral address/control bus 28 corresponding to the various input conductors of block 14 An enable input of the circuitry in block 14 is controlled by a DMA enable signal produced by inverter 48, the input of which is connected to conductor 23.

DMA control logic circuit 19 generates a signal DMAEN (direct memory address enable) on conductor 23. Conductor 23 is connected to the other input of OR gate 12. The DMAEN signal performs the function of enabling the data bus transceiver 13 to electrically connect the computer data bus 5A to the peripheral data bus 5B. The signal DMAEN also causes decoupling of the computer address bus conductors A0–A9 from peripheral address/control bus 28.

Peripheral address/control bus 28 is connected to a first address port 16B of a dual port "frame map memory" 15, in accordance with the present invention. Frame map memory 15 includes a first data port 16A coupled to the respective conductors of peripheral data bus 5B. A second address port 17B of frame map memory 15 is connected by conductors 20 to the address outputs of DMA controller logic circuitry 19.

DMA control logic circuitry 19 produces the above-mentioned DMAEN (direct memory address enable) signal on conductor 23. DMA control logic circuitry 19 also transmits a DMA request signal DMA REQ on conductor 7 to internal computer data bus 4, receives a DMA acknowledge signal DMA ACK on conductor 8 from internal computer bus 4, and a terminal count signal T/C on conductor 9 from internal computer bus 4. The three foregoing "handshaking" signals are received by and generated by the internal DMA controller 3D of IBM PC 3. Optionally, DMA controller logic circuitry 19 can receive an RDMAEN signal on conductor 26.

Frame map memory 15 includes a second data port 17A connected by a 16 bit internal bus 28B to block 18, which includes three-state buffers, DMA address circuitry, and control circuitry, the details of which are shown in FIG. 4C. The outputs of three-state buffer circuitry in block 18 are connected to peripheral address/control bus 28. Data port 17A also produces two signals EOF (end of frame) and EOG (end of group) on conductors 21 and 22, respectively.

DMA control logic circuitry 19 is coupled to the eight conductors of peripheral data bus 5B, to the twelve conductors of peripheral address/control bus 28, and to an optional RDMA INIT signal on conductor 25. DMA control logic circuitry 19 also produces a DMA INIT signal on conductor 24. The details of DMA control logic circuitry 19 are shown in FIG. 2.

Referring now to FIG. 2, the heart of DMA control logic circuitry 19 is a DMA sequencer circuit 29A, which is a "state machine" implementated in a suitably programmed programmable array logic (PAL) chip 29, shown in FIG. 4D. A dotted line 29 in FIG. 2 encloses DMA sequencer 29A and several other functions, all of which are implemented in the above-mentioned PAL chip, including a latch function 69 that receives a START signal at its set input and a STOP signal at its clear input and generates a request gate REQGT signal (referred to in Table 3, subsequently described) on conductor 70. The function of an AND gate 71 receiving the REQGT signal and a transfer request XREQ on conductor 42 also is included within the PAL chip 29. The output of the AND function 71 is applied as an input to the DMA sequencer state machine 29A. Those skilled in the art can determine how to program PAL 29 from the state definitions shown in Table 1, the state diagram shown in FIG. 7, and the corresponding truth table shown in Table 2.

TABLE 1

| DMA Sequencer State Machine | |
|---|---|
| Inputs | Outputs |
| STATE 0 IDLE, WAITING FOR XREQ | |
| XREQ = 0 | DMA REQ = 0 |
| EOF = 1 | DMAEN = 1 |
| EOG = 1 | |
| DMA ACK = 1 | |
| STATE 1 FRAME REQUEST ACTIVE, WAITING FOR DMA ACK* | |
| XREQ = 1 | DMA REQ = 1 |
| EOF = 1 | DMEAN = 1 |
| EOG = 1 | |
| DMA ACK = 1 | |
| STATE 2 DMA ACK* RECEIVED, NO EOG, EOF | |
| XREQ = X | DMA REQ = 1 |
| EOF = 1 | DMEAN = 0 |
| OEG = 1 | |
| DMA ACK = 0 | |
| STATE 3 DMA ACK* RECEIVED, EOG* ASSERTED | |
| XREQ = X | DMA REQ = 0 |
| EOF = 1 | DREQ = 0 |
| EOG = 0 | |
| DMA ACK = 0 | |
| STATE 4 DMA ACK* RECEIVED, EOF* ASSERTED | |
| XREQ = X | DMA REQ = 0 |
| EOF = 0 | DMEAN = 0 |
| EOG = X | |
| DMA ACK = 0 | |

TABLE 2

| | DMA Carrier Reduction STATE TABLES | | | | | |
|---|---|---|---|---|---|---|
| DMA INT* | DMA ACK | XREQ | EOF | EOG | SN | SN+1 |
| 0 | X | X | X | X | X | 0 |
| 1 | X | 0 | X | X | 0 | 0 |
| 1 | X | 1 | X | X | 0 | 1 |
| 1 | 1 | 1 | X | X | 1 | 1 |
| 1 | 1 | 0 | X | X | 1 | 1 |
| 1 | 0 | X | 1 | 1 | 1 | 2 |
| 1 | 0 | X | 1 | 0 | 1 | 3 |
| 1 | 0 | X | 0 | X | 1 | 4 |
| 1 | 0 | X | 1 | 0 | 2 | 3 |
| 1 | 0 | X | 0 | X | 2 | 4 |
| 1 | 0 | X | 1 | 1 | 2 | 2 |
| 1 | 1 | X | X | X | 2 | 1 |
| 1 | 0 | X | 1 | 0 | 3 | 3 |
| 1 | 0 | X | 0 | X | 3 | 4 |
| 1 | 1 | X | X | X | 3 | 1 |
| 1 | 0 | X | 0 | X | 4 | 4 |
| 1 | 1 | X | X | X | 4 | 0 |
| 1 | 1 | 1 | X | X | 4 | 4 |

DMA sequencer circuit 29A produces the DMA request signal DMA REQ on conductor 7 and transmits it to host computer 3, and receives the DMA acknowledge signal DMA ACK on conductor 8 from the host DMA controller 3D within host computer 3. DMA sequencer circuit 29A also produces a DMA enable signal DMAEN on conductor 23. DMA sequencer circuit 29A also receives a DMA INIT (DMA initialization) signal on conductor 24, a START signal produced by start select circuit 33, a STOP signal produced by stop select circuit 35, a transfer request XREQ on conductor 42, the EOF (end of frame) signal on conductor 21, and the EOG (end of group) signal on conductor 22.

DMA control logic circuitry 19 also includes a three-state frame address counter circuit 31 that is enabled by the DMAEN signal on conductor 23 in response to a DMA ACK (DMA acknowledge) signal received from host DMA controller 3D. The outputs of frame address counter 31 are connected to the individual conductors of bus 20 in order to provide addresses to frame map memory 15. Frame memory address counter 31 is reset by a signal produced on the output of OR gate 32, one input of which receives the EOF signal 21. The other input of OR gate 32 receives the DMA INIT signal on conductor 24.

The DMA transfer request signal XREO on conductor 42 is produced by DMA timing source select logic circuitry 40. The signal XREQ is applied to the input of a two input AND gate 39, the output of which is connected to the clock input of a source event counter circuit 38. The output of source event counter 38 is connected by conductor 37 to various "mode" inputs of start select circuit 33 and various "mode" inputs of stop select circuit 35. Start select circuit 33 has three inputs that receive a start command signal STRTCMD from control logic 45 on conductor 34. Stop select circuit 35 has two inputs that receives a stop command signal STPCMD from control logic 45 on conductor 36. Stop select circuit 35 has two inputs connected to receive the T/C (terminal count) signal on conductor 9. Start select circuit 33 and stop select circuit 35 are incorporated into the DMA mode control circuit designated by reference numeral 81 in FIG. 4F. The relationship between the STRTCMD signal 34, the STPCMD signal 36, the START signal 33A, the STOP signal 35A, and the REQGT signal 70 are set forth in the truth table of Table 3, wherein the subscript "n" represents the present clock pulse and the subscript "n+1" designates the next clock pulse.

Trigger source select circuitry 41 and DMA timing source select circuit 40 both are connected to a plurality of input conductors, collectively designated by reference numeral 27, from which an "event" or "source" signal to initiate a DMA transfer operation is to be selected and from which a timing or "trigger" signal that is to control the start time or stop time of a DMA transfer operation also is to be selected, in accordance with one of five different operating modes, subsequently explained.

A latch circuit 43 connected to an output of trigger source select circuitry 41 is connected to one input of AND gate 39. Latch circuitry is required because the selected trigger source signal may be a brief pulse. Consequently, the function of latch circuit 43 is to store the level of such a brief pulse.

A pacer clock circuit 44 that controls the timing of the DMA transfers effectuated by peripheral DMA controller 2 produces a signal that is applied to one of conductors 27. Control logic circuitry 45 in DMA control logic 19 has inputs connected to peripheral data bus 5B and peripheral control/address bus 28. In response to these inputs, control logic circuit 45 produces a plurality of control/enable signals on conductors 46, which are respectively connected to all of the blocks shown in FIG. 2; for convenience of illustration, however, the connections of most of conductors 46 are not actually shown, as they can be provided easily by those skilled in the art from the information in FIGS. 4A-4F.

Now that the basic structure of the peripheral DMA controller 2 has been described, the basic operation of the system shown in FIGS. 1 and 2 will be described. After the basic operation has been described, then the operation of the IBM PC host computer 3 to "set up" or program host DMA controller 3D in order to effectuate a DMA transfer will be described in detail. Then a number of alternate operating modes of the described embodiment of the invention will be described. Finally, a more detailed description of the logic circuitry in the individual blocks in FIGS. 1 and 2 will be described with reference to FIGS. 4A-4F in order to guide one skilled in the art in the actual construction of the presently preferred embodiment of the invention.

As mentioned above, IBM personal computer or host computer 3 includes both an internal processor 3A and an internal host DMA controller 3D, both of which are programmable machines. The host DMA controller 3D can effectuate a DMA transfer with what it recognizes to be only a single peripheral device, which, in accordance with the present invention, is the peripheral DMA controller 2.

During normal operation of host computer 3, addresses A0-A9 are effectively coupled to corresponding conductors of peripheral address/control bus 28, enabling host computer 3 to address dual port frame map memory 15 and any of the peripheral devices 49-1 ... 49-N if the data bus transceiver 13 is enabled. Data bus transceiver 13 is enabled by decoding the address bits A10-19 to enable host computer 3 to directly access peripheral data bus 5B when DMA control logic circuitry 19 is not addressing dual port frame map memory 15.

Memory write signal MEMWR and a memory read signal MEMR are also coupled from internal host bus 4 through three-state buffer circuitry in block 14 to peripheral address/control bus 21.

Thus, during normal operation, host computer 3 can perform read and write operations on the frame map memory 15 of peripheral DMA controller 2 and on any of the peripheral devices 49-1, etc. More particularly, host computer 3 can write data into port 16A of dual port frame map memory 15, which appears to host computer 3 as 128 sequential one-byte locations.

As mentioned above, host DMA controller 3D is a programmable machine. During execution of a user program by processor 3A, it is not in control of the system busses (5A, 6A and 6B), and both host DMA controller 3D and peripheral DMA controller 2 are idle. If the user program requires execution of a DMA operation, processor 3A will program host DMA controller 3D by programming it with the location of memory that is to be accessed by the desired DMA transfer. The processor 3A also programs the host DMA controller 3D with the number of bytes to be transferred in the DMA operation, and then enables host DMA controller 3D to "take over" the internal bus 4, which includes busses 5B, 6A and 6B of host computer 3.

Thus, host computer 3 has to set up a DMA transaction initially by appropriately programming host DMA controller 3D. Once this is accomplished, the DMA transaction occurs without further action by internal processor 3A. The IBM PC's host DMA controller is a "classical" device-to-memory DMA controller, which transfers one byte from the data bus to the destination memory for each DMA "handshaking" cycle.

Also, an instruction to "autoinitialize" can be programmed into host DMA controller 3D, so that when the programmed byte count has been decremented to zero, host DMA controller 3D reloads the current address register in the host DMA controller from the base register and begins a new sequence. This mode is used to give pretrigger and post trigger information in a data "buffer", subsequently described. If the delay programmed is less than the buffer size, then the data left in the memory after the sequence is complete will consist of a mixture of new and old data. The current address register of host DMA controller 3D will give the location of the last byte transferred. The trigger point then can be located by going backward from that byte through the number of frames specified by the source event trigger register, so that everything between the current address pointer and the trigger point is posttrigger data and the rest is pretrigger data.

After host DMA controller 3D is programmed to perform a DMA transfer, it can perform that DMA transfer with peripheral DMA controller 2 by performing a normal DMA transfer of one byte between peripheral data bus 5B and an internal memory of host computer 3. Such a one byte transfer is referred to as a "DMA cycle". At the end of a DMA cycle, host DMA controller 3D returns control of bus 4 to the processor 3A. A "frame" is defined as the block of data sent to memory each time a "DMA transfer" occurs. A "DMA transfer" consists of the number of DMA one byte cycles necessary to transfer all of the frame elements, i.e., list entries, contained in frame map memory 15.

In "setting up" a DMA transfer, host computer 3A writes a "frame list" into sequential locations of dual port frame map memory 15. Each entry in the frame list includes a ten bit address of a peripheral device coupled to the peripheral address/control bus 28 and the peripheral data bus 5B, a "direction" or read/write bit to identify the direction of the desired DMA transfer, an EOF (End of Frame) flag bit to identify that the last element of the list entry has been transferred, i.e., the entire frame has been transferred, and an EOG (End of Group) flag bit which, as subsequently explained, can be used to effectuate a higher speed mode of DMA operation.

During each host DMA cycle, the DMA control logic (or "list controller") 19 accesses dual port frame map memory 15, pointing to a successive "frame element" or frame list entry. The contents of that frame element in the list become the address of the byte to be transferred during that DMA cycle. At the end of each DMA cycle, the peripheral DMA control logic 19 increments the list address in frame map memory address counter 31 (FIG. 2) by one, so that the peripheral DMA control logic 19 points to the next element of the frame for the next DMA cycle. If the EOF flag is a "0" (i.e., "active") in the present frame element, indicating that the entire frame has been transferred, DMA control logic 19 resets the frame map memory address counter 31 to zero for the next DMA cycle.

By way of definition, logic states of various signals described herein will be defined. For the EOF signal, a "1" designates an "inactive" state. For EOG, the "1" level designates its "inactive" state. For DMA ACK, a "1", defines its "inactive" state. For DMA REQ, a "1" defines its "active" state. For DMAEN, a "1" designates its "inactive" state. For DMA INIT, the "1" level defines its "inactive" state.

During each DMA memory cycle, peripheral DMA control logic 19 controls the peripheral address bus 28 and the data of the frame element pointed to by address counter 31 becomes the address and control signal output to the peripheral data bus 28.

When a particular DMA cycle is complete, the peripheral DMA control logic 19 switches control of the peripheral address bus back to the host computer 3 by causing the DMAEN (DMA enable) signal on conductor 23 to be a "1", coupling the conductors of data bus 5A to corresponding conductors of peripheral data bus 5B and enabling the three-state buffers in block 14. At the end of each DMA cycle, peripheral DMA control logic 19 also increments frame map memory address counter 31 so that it points to the next frame element in frame map memory 15, ready for the next byte transfer, unless the EOF flag is set. If the EOF flag is set to its "active" state, i.e., a "0", frame map memory address counter 31 is reset to the address of the first frame element for the next "DMA transfer".

Thus, the frame list, including sequential addresses of up to 64 eight-bit peripheral devices, all of which can be random, can be transferred to sequential locations of a destination memory, using only the single available DMA channel of host DMA controller 3D.

The operation of peripheral DMA controller is initiated by a "transaction request signal" called XREQ, which can be selected from signals on a variety of input conductors 27, depending upon how DMA timing source select circuit 40 is initially programmed by processor 3A.

The transaction request signal XREQ can be any external signal that is synchronized to an event that the system 1 shown in FIG. 1 (which is basically a data acquisition system) is trying to monitor. For example, the selected XREQ signal can be an interrupt request from any of the peripheral devices 49-1 . . . 49-N, any other external signal, or a signal from the pacer clock circuit 44 of FIG. 2. As an example, the transaction request signal XREQ might be generated in response to an "End of Conversion" signal from an analog-to-digital converter.

The pacer clock circuit 44 can be programmed to operate at any frequency from 0.001 Hz to 2 MHz, to determine the number of transactions per second that can be accomplished during a DMA transfer.

With the foregoing information in mind, it now will be convenient to describe the handshaking operation that occurs between the host DMA controller 3D and the peripheral DMA controller logic in order to accomplish one DMA cycle.

It is assumed that the End of Group signal EOG is a logical "1", as is normally the case for the IBM PC. In response to a transaction request signal XREQ on conductor 42 (FIG. 2) that has been selected by DMA timing source select circuit 40, DMA sequencer circuit 29 causes the signal DMA REQ to be generated on conductor 7 (assuming that start select circuit 33 and has produced the signal START on conductor 33A).

Host DMA controller 3D responds to this automatically by generating a DMA acknowledge signal DMA ACK on conductor 8. In response to the DMA ACK signal, peripheral DMA sequencer 29 generates a signal DMAEN on conductor 23, disconnecting peripheral address/control bus 28 from PC address bus connector 6A and enabling the outputs of frame map memory address counter 31 so that dual port frame map memory 15 is addressed by DMA control logic 19. This causes the data of the first frame element to appear on bus 28B.

Three-state buffer circuitry in block 18, in response to DMAEN, connects bus 28B to peripheral address/control bus 28. The direction signal on conductor 28A enables data bus transceiver circuit 13 in the appropriate direction, depending on the direction of the desired DMA transfer. The DMA REQ signal is inhibited for one cycle, allowing the processor of host computer 3 to operate for a cycle. If the End of Frame signal EOF is not asserted, i.e., "active", on conductor 21 for the present frame element, DMA sequencer 29 then immediately produces a new logical "1" on DMA REQ conductor 7, waits for another DMA ACK signal on conductor 8, and effectuates transfer of the data corresponding to the next entry, i.e., frame element, in the frame list.

(Note that the internal DMA controller in the IBM PC has four channels, and they are prioritized. When the peripheral DMA controller 2 of the present invention relinquishes control of the bus after a single byte DMA transfer, the internal DMA controller of the IBM PC has to arbitrate between the peripheral DMA controller and other channels of the internal DMA controller that may be requesting transfers. In addition to that, the processor 3A will always use at least one instruction cycle.)

When entire "block" of data constituting all of the bytes of all of the frames to be included in the requested DMA operation have been transferred, host DMA controller 3D generates the terminal count signal T/C on conductor 9. This informs the stop logic 35 of FIG. 2 to generate a STOP signal on conductor 35A, informing the DMA sequencer 29 that the entire DMA sequence has been completed.

As an example, if a user program wished to acquire data from an analog channel (such as an analog-to-digital converter), and the contents of a 16 bit counter, each connected as a peripheral device between the peripheral address bus 5B and the peripheral address bus 28, the user program first would write the addresses of those peripheral devices, in sequential order, in the frame list in dual port frame map memory 15. For this example, the waveforms in FIG. 3 illustrate the handshaking operation between peripheral DMA controller 19 and host or internal DMA controller 3D, assuming that each frame contains only four bytes. (Note that each frame can include up to 64 bytes for the described system.) The first pulse 54A of the transaction request waveform XREQ appears on conductor 42 (after having been selected from one of the conductors 27 by the DMA timing source select circuit 40). This causes DMA sequencer 29 to produce the first pulse 55A of the DMA request waveform DMA REQ. Shortly thereafter, the DMA ACK* signal goes low, as indicated by reference numeral 56A.

(Note that asterisks are used herein to identify logical complement signals, as the printer being utilized cannot overscore as is usual to identify logical complement signals.)

Then, DMA sequencer 29 generates the DMAEN signal on conductor 30, giving control of the peripheral data and address busses to peripheral DMA control logic 19, and enabling the outputs of address counter 31, thereby effectuating transfer of the first byte of the frame in the appropriate direction and also causing DMA REQ to become "inactive".

Control of the internal bus 4 is relinquished to processor 3A by host DMA controller 3D for the duration of DMA ACK, and then a new DMA REQ pulse 55B is produced. A second DMA ACK pulse 56B then is produced, and the second byte of the frame is transferred. The same sequence is repeated for all four of the bytes in the above defined frame. During the last of the four DMA cycles, EOF pulse 57 appears at port 7A of dual port memory 15 to indicate that the current byte is the last in the frame to be transferred. If the terminal count signal T/C has not been generated, the STOP signal on conductor 35A has not yet appeared, so DMA sequencer 29 honors the next transfer request pulse 54B on conductor 42, and the foregoing operation will repeat until the entire DMA block of data originally requested has been transferred, at which time the T/C signal will be produced by host DMA controller 3D, and the STOP signal will appear and cause DMA sequencer 29 to end the DMA operation.

Note that the occurrence of the EOF signal indicates only the end of transfer of a frame, not a block of data, which may include many frames; i.e., the EOF signal only indicates the end of a "DMA transfer" or transfer of one frame. The number of transfers or transactions is equal to the number of bytes (the byte count) programmed into the host DMA controller 3D multiplied by the number of bytes per frame. The terminal count signal T/C is generated only after all bytes requested have been transferred.

Further understanding of the operation can perhaps be had by referring to the memory map of FIG. 5. FIG. 5 shows a memory map diagram in which all addresses accessible by the host computer 3 are designated by block 70, and addresses of all devices connected to both peripheral data bus 5B and peripheral address bus 28 are designated by block 65. The relative locations of four of the peripheral devices 49 are shown in peripheral bus memory map 65, namely the addresses designated as byte 1, byte 2, byte 3, and byte 4. Note that these peripheral device addresses are not contiguous and are not sequential, i.e., consecutive.

The object of a typical DMA transfer operation would be to rapidly transfer bytes 1-4 from their noncontiguous, nonconsecutive locations in peripheral bus memory map 65 to four contiguous, consecutive sequential addresses, beginning with base address 67, in host computer memory map 70. Arrow 61 would represent the transfer of the first byte from the peripheral device in which it is originally stored to the lowest address or base address 67 in a portion of the host computer memory referred to as "data buffer" 67A. Similarly, arrows 62, 63, and 64 represent DMA one-byte transfers of data from the peripheral devices 49 in which bytes 2, 3, and 4 are stored to the next three consecutive addresses in buffer 67A.

An important advantage of the above-described operation is that the host computer 3 does not need to be dedicated to the DMA transfers while they are occurring, and instead can attend to other data processing tasks between DMA memory cycles. In other words, the above-described DMA transfer technique is effectuated by "stealing" cycles from processor 3A. After host DMA controller 3D is programmed to effectuate a DMA transfer, the DMA transfer occurs essentially "invisibly" with respect to the user program.

Another advantage is that DMA transfers can be accomplished with peripheral devices 49 that do not have extra circuitry required to enable them to perform the above-described handshaking operations with host DMA controller 3D. This reduces the cost of peripheral devices and allows DMA transfers with ordinary, low cost peripheral devices.

Most importantly, perhaps, is the fact that DMA transfers to a large number of peripheral devices can be accomplished with only one channel of the host DMA controller Usually, it would be unacceptably expensive to provide a separate channel of a DMA controller for each peripheral device with which a DMA transfer is to be accomplished.

Thus, what the present invention accomplishes is providing of an external block of logic circuitry, having DMA handshaking capability, that "mimics" the host computer as far as the peripheral devices 49 are concerned, so that those peripheral devices need have no special capabilities to accomplish DMA transfers.

The above-described operation of the system shown in FIG. 1 assumes that the End of Group signal EOG is a logical "1", instead of a logical "0". If EOG is a "1", DMA sequencer logic 29 holds DMA REQ high until EOG or EOF is "active" or a "0". This prevents control of internal bus 4 from being transferred back to processor 3A between DMA cycles, and can accomplish a much higher DMA data transfer rate. However, if the host computer 3 is an IBM PC, this could be a very dangerous technique, because one of the host DMA controller channels is utilized to effectuate automatic refreshing of the internal dynamic RAM. If a continuous large block DMA transfer is accomplished while the signal EOG is being held at a "1", and such transfer requires more than the minimum refresh time of the dynamic memory, there would be a great risk of losing stored data. As shown in FIG. 2, DMA sequencer 29 receives the XREQ, EOF, EOG, DMA INIT, START, DMA ACK, and STOP signals, and also generates the DMA REQ and DMAEN signals accordingly. The XREQ signal indicates to DMA sequencer that transfer of an entire frame, i e., when to begin a "DMA transfer" operation is needed. The signal START informs the DMA sequencer 29 precisely the time to begin "honoring" the XREQ signal, which typically is periodic, especially if XREQ is generated by the pacer clock circuit 44. (The START signal can be generated in a number of ways, depending upon which of the above-mentioned five operating modes is selected. The STOP signal also can be generated in a number of ways, including by computer command or by the occurrence of the terminal count signal T/C.)

The occurrence of the EOF signal, indicating that DMA sequencer 29 has effectuated transfer of an entire frame, means that the DMA sequencer should not cause any more DMA memory cycles to occur until another XREQ signal is received. DMA sequencer 29 can be implemented a number of ways. In the presently preferred embodiment of the invention, DMA sequencer 29 is a state machine implemented by means of a programmed array logic (PAL) integrated circuit, which can be a PAL16R4 integrated circuit manufactured by National Semiconductor and others.

The DMA INIT signal is issued by the control/logic select circuit 45, and initializes the DMA sequencer 29 and resets frame map memory address counter 31. The DMA INIT signal is issued as a result of a computer command. The PC program the control/logic select circuit 45 so as to make it generate the DMA INIT signal.

The timing source select circuit 40 operates in response to one of the control signals 46 from control/select logic 45 to cause the one of the eight external signals 27 to be selected and used as the XREQ signal on conductor 42. Recall, however, that DMA sequencer 29 ignores the XREQ signals until a START signal has been produced on conductor 33A by start logic 33. Trigger source select circuit 41 controls which of the eight signals 27 is used as a "trigger" to precisely determine the timing of initiating operation of DMA sequencer 29 (after an XREQ signal has been received). Source event counter 38 counts the number of XREQ pulses and generates an output signal on conductor 34 when a preset number (programmed into the source event counter) of XREQ pulses have occurred The circuit is used to determine precisely when either the START signal or the STOP is produced, depending on which mode is selected, and thus when the DMA sequencer 29 is to start or stop "honoring" transaction request signals XREQ.

The output of source event counter 38 also drives the stop logic 35 via conductor 36. Thus, the source event counter 38 can be programmed to control the starting and stopping of a DMA process, if a certain operating mode is selected. This can be very useful in a data acquisition system in which it is desired to monitor a series of signals with the object of collecting a continuum of data for predetermined amount of time before, and a predetermined amount of time after a nonsynchronous "event signal" occurs. Host DMA controller 3D can be programmed to fill up its buffer 67A (FIG. 5), start at the above-mentioned base address, and collect or transfer a predetermined byte count of bytes, and then repeat the process. Using the "start immediately, stop on event after delay"mode of operation (subsequently described), the above buffer is continually filled in a circular fashion until the event of interest being monitored occurs. When it occurs, a number N more samples or bytes would be collected. Then the data acquisition would be stopped, and the data in the buffer would include N samples that occurred after the occurrence of the event of interest or trigger and a number equal to the buffer length minus N samples that occurred before the "trigger" event.

In accordance with the present invention, the start logic and stop logic 33 and 35, respectively, are implemented in the same PAL as the DMA sequencer 29. The truth table programmed into the PAL to implement the start and stop logic functions are given in Table 3.

The trigger event is the event that precisely starts or stops the whole series of DMA transactions which comprise a data acquisition "run" or a "DMA transfer". The following is a list of operating modes, i.e., different options for generating the START and STOP signals.

(1) Mode 0: "Start on event after delay, stop on terminal count signal T/C." The delay referred to is the preprogrammed setting of the source event counter 38. This counter must be preprogrammed for the appropriate delay, and enabled by the selected trigger signal selected by trigger source select circuit 41. This mode is useful for taking a fixed "snapshot" of data triggered by some event of interest.

(2) Mode 1: "Start on event after delay, stop on command." In this mode, transfers begin upon occurrence of an event of interest and will continue until the computer issues a stop command. What is left in the host memory is the most recent data.

(3) Mode 3: "Start on command, stop on terminal count signal T/C." A fixed buffer size of data is transferred, but the start of the transfer is determined by a software command instead of an event.

(4) Mode 3: "Start on command, stop on event after delay." This mode is used to provide pretrigger and post trigger information in the data buffer. The data buffer is a circular buffer in memory by virtue of the autoinitialize command. If the delay programmed is less than the buffer size, then the data left in the memory after the sequence will consist of a mixture of pretrigger and post trigger information.

(5) Mode 4: "Start on command, stop on command." Software commands initiate and stop the DMA transfer.

The multiple inputs of start select circuit and stop select circuit 35 correspond to the above-described Mode O through Mode 4. Depending upon which of the five modes is programmed into the control logic 45, the corresponding input of each of start select circuit 33 and stop select circuit 35 will be the one selected and coupled to various ones of conductors 33A and 35A, respectively.

Next, a detailed example will be given of how host processor 3A sets up or programs host DMA controller 3D in order to effectuate a DMA transfer. In the assumed example, as described with reference to the flow chart of FIG. 6, host DMA controller 3D is designated by PCDMA, and the peripheral DMA controller is designed by IDMA. In this example, 500 frames of four bytes each are to be transferred in a DMA operation from four peripheral bus addresses to the host computer memory. The following four hexadecimal addresses $101, $209, $301, and $302 are used. (A dollar sign before an address represents hexadecimal coding.) The DMA transfer is set up or programmed to begin on an external event, with a delay of two transaction requests being programmed into the source event counter 38. The DMA transfer is programmed to stop on the occurrence of the terminal count signal T/C. The transactions are to be timed by the pacer clock circuit 44.

Referring to FIG. 6, programming of the host DMA controller begins at label 100. In block 101, a destination address $4000 is loaded into host DMA controller 3D. Then, in block 102, the byte count is computed by multiplying 500 frames times four bytes per frame, indicating that 2,000 bytes are to be transferred. In block 103 the byte count is located into the byte count register of the host DMA controller 3D. Next, the transfer mode is stored in the host DMA controller. In the present example, that mode means that one DMA REQ signal results in one DMA ACK signal. The peripheral DMA controller has to arbitrate with other peripherals that may be connected to the IBM PC bus 4 before each DMA cycle The transfer mode also indicates that it is a "read transfer", meaning the R/W signal is set to indicate reading data out of the peripheral devices and writing it into the memory of the host computer 3.

In block 105 of FIG. 6, processor 3A writes the frame list bytes 1 and 2 into the dual port frame map memory 15. In other words, $101, the address of the first byte to be transferred, is written to locations $80 and $81 of the frame map memory, assuming that the frame map in the described embodiment of the invention is fixed at locations $80 to $FF of the address bus 6A.

Next, as indicated in block 106, the peripheral address $209 is written into addresses $82 and $83 of the frame map memory. In block 107, bytes 5 and 6, or $301, are written into addresses $84 and $85. In block 108, $302 is written into addresses $86 and $87. In each of blocks 105-108, the EOG bit is set to a "1". In each of the blocks 105-107, the EOF is set to a "0". In block 108, the EOF bit is set to a "1" to indicate that the entire frame has been transferred.

In block 109, the host computer sets the pacer clock frequency. In block 110 the host computer writes a DMA mode byte into control/logic select circuit 45 of FIG. 2. For the present example, the above-mentioned "Mode 0" is the one selected. In block 112, the source event counter 38 is programmed to delay generation of the start signal by two XREQ signals for generating the START signal. In block 113, the DMA timing source select circuit 40 is programmed to select the pacer clock signal as the "source" of the XREQ or transfer request signal.

Next, in block 114, an external trigger signal, possibly one of the signals 27 other than the pacer clock output 44, is selected to be the DMA trigger source signal. Then, in block 115, the IDMA INIT bit in control/logic select circuit 45 is programmed so that the DMA sequencer 29, the frame map memory address circuit 31, and other circuitry is properly initialized. Then, in block 116, processor 3A enables the host DMA controller 3D by writing a word to a DMA control register therein.

Next, the pacer clock is enabled, as indicated in block 116, so that it begins outputting its pulses at the programmed frequency. In block 118, processor 3A enables the source event counter 38 to begin counting. In block 119, processor 3A clears the DMA INIT signal, thereby enabling the peripheral DMA controller 2 to begin the desired DMA transfer. When the external event occurs, the source event counter 38 will count two more pacer counts (which are selected to be the XREQ signals) and then will begin initiating DMA REQ signals. It will continue this operation until all 2,000 bytes have been transferred without further action by the host computer.

A program for carrying out the steps indicated in the flow chart of FIG. 6 is attached hereto as Appendix 1.

Figure 7:
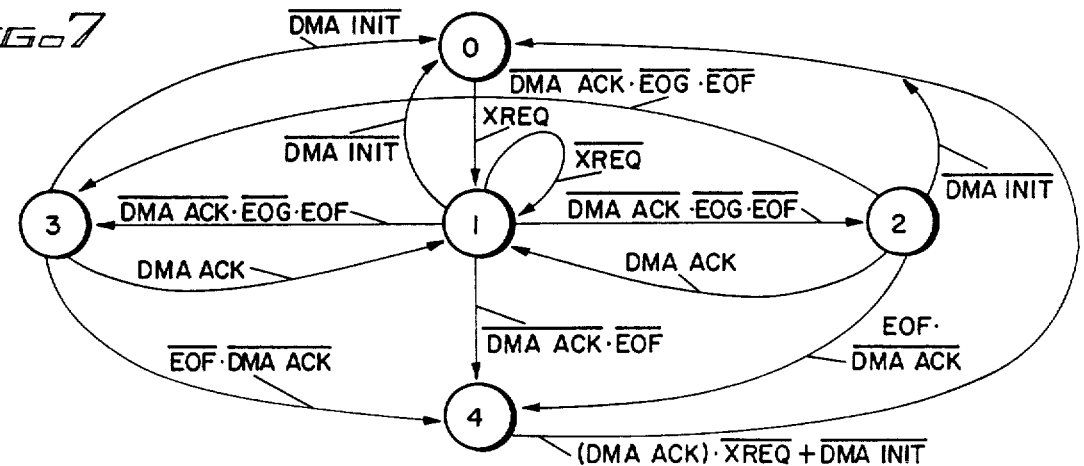
FIG. 7 is a state diagram of the DMA sequencer included in FIG. 2.

Next, the state machine used to implement the DMA sequencer 29 of FIG. 2 will be described. A typical state diagram is shown in FIG. 7. The state machine of FIG. 7 defines five states, namely State 0, State 1, State 2, State 3, and State 4. Table 1, above, defines each of the states, indicating the input levels and output levels of the DMA sequencer 29 for that state. In Table 1, the logic level "X" indicates the "don't care" condition. State O is defined as the "idle" state, in which the DMA sequencer is waiting for an XREQ or transaction request signal to go active. The information in Table 1, in effect, defines the "1" and "0" states of EOF, EOG, DMA ACK, and DMA REQ. The End of Frame signal EOF in Table 1 is "inactive" when EOF="1". EOG="1" defines the "inactive" state. DMA ACK="1" defines its inactive state. DMA REQ equals "0" its inactive state. In other words, at the idle state, the level of each of the inputs and outputs defines the inactive state of those inputs and outputs. State 1 indicates that the XREQ signal has gone active. This causes DMA REQ to go from a "0" to a "1". DMAEN remains inactive, because the DMA sequencer is waiting for an acknowledge from the host computer.

In State 2, the acknowledge has been received, DMA ACK goes active, i.e., to a "0", and DMAEN goes active, from a "1" to a "0", so that the peripheral DMA controller 2 now controls the peripheral data bus and the peripheral address bus. In State 2, EOG and EOF remain inactive. State 3, which is similar to State 2 except that EOG goes active, from a 1 to a 0, causes DMA REQ to return to its "inactive" level. DMAEN remains "active" in State 3.

In State 4, DMA ACK is active. EOF has gone active, and DMA REQ is "inactive", and DMAEN is "active". State 4 defines the End of Frame condition.

In the state diagram of FIG. 4, each of the above states is represented by a circle with the state number therein, and the arrows between the states represent the events that cause the DMA sequencer to go from each state to the other. Logical expressions indicating such events are shown beside the corresponding event arrows.

The truth table shown in Table 2 above represents essentially the same information that is shown in the state diagram of FIG. 7. One skilled in the art can readily derive logic equations from the truth table or the state diagram, therefore the details will not be set forth herein.

Table 3 defines the truth table for the start and stop logic designated by reference numerals 33 and 35 in FIG. 2. One skilled in the art can readily use the information in Tables 2 and 3 to program a PAL to obtain the DMA sequencer, start logic, and stop logic circuits, or he can readily derive the logic equations for the functions of these circuits, and can, of course, use the logic equations to design a suitable logic circuit.

TABLE 3

| DMA INIT | $REQGT_n$ | STPCMD | STRTCMD | STP | STRT | $REQGT_{n+1}$ |
|---|---|---|---|---|---|---|
| 1 | 0 | 0 | 0 | 0 | 0 | 0 |
| 1 | 0 | 0 | 0 | 0 | 1 | 0 |
| 1 | 0 | 0 | 0 | 1 | 0 | 0 |
| 1 | 0 | 0 | 0 | 1 | 1 | 0 |
| 1 | 0 | 0 | 1 | 0 | 0 | 0 |
| 1 | 0 | 0 | 1 | 0 | 1 | 0 |
| 1 | 0 | 0 | 1 | 1 | 0 | 0 |
| 1 | 0 | 0 | 1 | 1 | 1 | 0 |
| 1 | 0 | 1 | 0 | 0 | 0 | 1 |
| 1 | 0 | 1 | 0 | 0 | 1 | 1 |
| 1 | 0 | 1 | 0 | 1 | 0 | 0 |
| 1 | 0 | 1 | 0 | 1 | 1 | 0 |
| 1 | 0 | 1 | 1 | 0 | 0 | 0 |
| 1 | 0 | 1 | 1 | 0 | 1 | 1 |

TABLE 3-continued

| DMA INIT | REQGT$_n$ | STPCMD | STRTCMD | STP | STRT | REQGT$_{n+1}$ |
|---|---|---|---|---|---|---|
| 1 | 0 | 1 | 1 | 1 | 0 | 0 |
| 1 | 0 | 1 | 1 | 1 | 0 | 0 |
| 1 | 1 | 0 | 0 | 0 | 0 | 0 |
| 1 | 1 | 0 | 0 | 0 | 1 | 0 |
| 1 | 1 | 0 | 0 | 1 | 0 | 0 |
| 1 | 1 | 0 | 0 | 1 | 1 | 0 |
| 1 | 1 | 0 | 1 | 0 | 0 | 0 |
| 1 | 1 | 0 | 1 | 0 | 1 | 0 |
| 1 | 1 | 0 | 1 | 1 | 0 | 0 |
| 1 | 1 | 0 | 1 | 1 | 1 | 0 |
| 1 | 1 | 1 | 0 | 0 | 0 | 1 |
| 1 | 1 | 1 | 0 | 0 | 1 | 1 |
| 1 | 1 | 1 | 0 | 1 | 0 | 0 |
| 1 | 1 | 1 | 0 | 1 | 1 | 0 |
| 1 | 1 | 1 | 1 | 0 | 0 | 1 |
| 1 | 1 | 1 | 1 | 0 | 1 | 1 |
| 1 | 1 | 1 | 1 | 1 | 0 | 0 |
| 1 | 1 | 1 | 1 | 1 | 1 | 0 |

STRT = START
STP = STOP
STRTCMD = START COMMAND
STPCMD = STOP COMMAND
REQGT$_n$ = a Request gate The data bus transceiver 13 shown in FIG. 3 can be a 74LS245 integrated circuit, which is widely available. The primary address decode circuit 10 of FIG. 2 and related circuitry is shown in more detail in FIG. 4A. Primary address decode circuit 10 consists mainly of a ten position DIP switch 10A, a digital comparator 10B, which can be 74LS85 integrated circuit, and a digital comparator 10C, which can be a 74ALS520 integrated circuit.

The circuitry shown in block 14 of FIG. 1 is shown in detail in FIG. 4B. The three-state buffers are designated by reference numeral 14A and 14B, and can be 74LS244 three-state buffer integrated circuits.

FIG. 4C shows the three-state buffers in block 18 of FIG. 1. These buffers are implemented by means of two 74LS244 integrated circuits.

FIG. 4D shows the connections to the PAL (programmed array logic) integrated circuit 29A by means of which the DMA sequencer 29 and the start logic 33 and stop logic 35 are implemented. An PAL16R4 integrated circuit is utilized.

FIG. 4E is a detailed block diagram of the dual port frame map memory 15. The part numbers for commercially available integrated circuits are indicated within the various blocks. The WRT* signal is a read/write signal. The LISTEN (list enable) signal is generated by secondary decode logic 10 (FIG. 1) to indicate that host processor 3 is accessing the frame map memory 1. The HOST signal (FIG. 4E) indicates that a program transfer to the peripheral devices 49 is occurring.

FIG. 4F is a detailed block diagram of the control logic circuitry 45 of FIG. 1. The control logic circuitry sets up the DMA controller. Block 45A in FIG. 4F contains latches by means of which the processor 3A can read the status of the peripheral DMA controller 2, so as to determine if a DMA transfer is occurring and if there has been an error in the DMA operation. Block 38,44 includes a timer/counter circuit that serves two purposes. More specifically, the circuit contains three counters, two of which are utilized to generate the pacer clock signal applied to the conductor connected to pacer clock circuit 44 in FIG. 2. The third counter is used to generate the delay produced by the source event counter circuit 38 (FIG. 2) on conductor 37 and applied to the start select circuit 33 and the stop select circuit 35.

The 74LS374 contained in block 80 of FIG. 4F is utilized as a "mode control register". Its outputs determine whether mode 0, mode 1, mode 2, mode 3, or mode 4 has been programmed into the control logic 45 of FIG. 2. This circuit also enables the pacer clock 44 and also enables the source event counter 38. The 74LS153 contained in block 81 of FIG. 4F is a multiplexer circuit, and performs the function of selecting the source of the start and stop signals produced by blocks 33 and 35 in FIG. 2. The timing source select circuitry and trigger source select circuitry are contained in block 40,41 of FIG. 4F. This circuitry includes a multiplexer that selects which one of the eight lines output by the octal latches should go to AND gate 39 and latch 43. Typically, the processor 3A would write four bits of the eight octal latches in block 82 to determine the trigger select channel and would write the four other bits to select the event source channel. The DMA timing source select circuit 40 and the trigger source select 41 are implemented by means of a PAL16H2 programmed array logic chip, as indicated in FIG. 4F. Table 4 shows the truth table that is programmed into that chip.

TABLE 4

| STB$_n$ | A$_n$ | B$_n$ | C$_n$ | Y$_n$ |
|---|---|---|---|---|
| 0 | 0 | 0 | 0 | 1IRQ0 |
| 0 | 0 | 0 | 1 | 2IRQ0 |
| 0 | 0 | 1 | 0 | 3IRQ0 |
| 0 | 0 | 1 | 1 | 1SYNC OUT |
| 0 | 0 | 0 | 0 | 2SYNC OUT |
| 0 | 1 | 0 | 1 | 3SYNC OUT |
| 0 | 1 | 1 | 0 | EXT IN |
| 0 | 1 | 1 | 1 | PACER |
| 1 | x | x | x | 0 |

Where A$_n$, B$_n$ and C$_n$ are the multiplexer channel select inputs and STB$_n$ is an enable input, all received from control logic 45.

In Table 4 Y$_n$ represents either of the two outputs of the PAL, i.e., either the timing source output or the trigger source output. The inputs are a strobe signal STB$_n$, A$_n$, B$_n$, and C$_n$, representing an enable input and three address inputs, respectively. The PAL chip includes two of the truth tables of Table 4 therein, one for the DMA timing source select circuit 40 and another for trigger source select circuit 41. For one of the truth tables, $Y_n$ is XREQ, and for the other truth table, $Y_n$ is the input to latch circuit 43.

In the described embodiment of the invention, the circuit of the peripheral DMA controller 2 of FIG. 1 is included on a printed circuit board that can be plugged into an empty slot in the IBM PC. Actually, that printed circuit board is configured so that five such printed circuit boards can be plugged into five vacant slots in the IBM PC and "daisy chained" together allowing as many as 192 peripheral devices such as 49 to be monitored and read out of or written into by means of DMA transfers. When more than one of the peripheral DMA controllers are plugged into the IBM PC, one of the three peripheral DMA controllers 2 acts as a "master" and the other one or two function as "slaves" which are connected in a daisy chained configuration to the master. The DMAEN conductor 23 and the DMA INIT conductor 24 of the master are connected to conductors 26 and 25, respectively, of the "first" daisy chained "slave" unit, i.e., the one closest to the "master". The conductors 23 and 24 of the first daisy chained "slave" then are respectively connected to conductors 26 and 25 of the second daisy chained "slave" unit. The jumpers referred to by reference numerals 30 in FIG. 2 can be switched to convert RDMAEN conductor 26 instead of DMAEN conductor 23 to DMA sequencer block 29A, and to convert RDMA INIT conductor 25 instead of DMA INIT conductor 24 to control logic 45 if the peripheral DMA controller 2 is to be a "slave" instead of a "master".

In the described embodiment of the invention, the frame map memory address counter 31 is implemented by means of 74LS590, shown in FIG. 4E.

The source event counter 38 is implemented by means of an Intel 8254, shown in FIG. 4F. The DMA timing source select circuit 40 and the trigger source select 41 are also indicated in FIG. 4F, and are implemented by means of a PAL16H2 PAL and a 74L5374 octal latch circuit, respectively.

The above-described embodiment of the invention provides a solution to the longstanding problem of allowing DMA operations to be economically performed in data acquisition systems by allowing a single DMA controller channel of a host computer to effectively access a very large number of peripheral devices and perform DMA transfers of large amounts of data from nonsequential peripheral address locations to contiguous, consecutive locations in a host computer memory, or vice versa. This is accomplished with no need for the host computer to be dedicated entirely to the DMA or data acquisition function.

While the invention has been described with reference to one embodiment thereof, those skilled in the art will be able to make various modifications to the described embodiment of the invention without departing from the true spirit and scope thereof. For example, the above-described circuitry could be easily modified to operate in conjunction with a VME BUS, a MULTI BUS, buses in computers manufactured by Digital Equipment Corporation, Motorola's VERSA BUS, and more generally, in conjunction with any memory mapped input/output subsystem.

APPENDIX

DMAPAT.PAS ( Peripheral DMA Controller for Data Acquisition Systems Patent

Example program illustrating the setup and execution of a DMA transfer operation.

Date      : Feb. 06, 1986
Language  : TURBO PASCAL

Description :

Transfer 500 frames of 4 bytes each (Peripheral device addresses
   $101, $209, $301, and $302). Transfers are triggered by EXTIN,
   transfers begin after a delay of 2 pacer clock periods, and the
   balance of the transfers are timed by the pacer clock. Transfers
   stop on a terminal count of 2000 bytes (500 frames * 4 bytes).
   Data is transferred to consecutive bytes of computer memory
   starting a address $4000.

}

Program DMAExample ;

```
Const

{ ***************  Computer Specific Constants   ********************** }

PCDMABase      = $02  ;  { PC's DMA controller   - Base        Offset }
PCDMACount     = $03  ;  { PC's DMA controller   - Count       Offset }
PCDMAMode      = $0B  ;  { PC's DMA controller   - Mode        Offset }

{ ***************  Peripheral Specific Constants  ********************** }

CardSeg        = $C000 ; { Card Segment Address                        }

PacDelCtrl     = $43  ;  { Pacer & Delay counter - Control     Offset }
PacCnt1Mode2   = $34  ;  { Pacer Count 1 Mode 2 Control Byte          }
PacCnt2Mode2   = $74  ;  { Pacer Count 2 Mode 2 Control Byte          }
DelyCntMode0   = $08  ;  { Delay Counter Mode 0 Control Byte          }

PacerCount1    = $40  ;  { Pacer                 - Count 1     Offset }
PacerCount2    = $41  ;  { Pacer                 - Count 2     Offset }
DelayCount     = $42  ;  { Delay Counter         - Count       Offset }

FrameMem       = $80  ;  { Frame Memory          - Start       Offset }

CardDMAMode    = $02  ;  { Card DMA controller   - Mode        Offset }
CardDMASrcTrg  = $03  ;  { Card DMA controller   - Source/Trigger Offset }

{ **************  Acquisition Specific Constants  ********************** }

XferMode       = $45  ;  { Single, No Autoinit, DMA Channel 1, Write Xfer }

BufferBase     = $4000 ; { Base Address of the Data Memory Buffer      }

TotalFrames    = 500  ;  { Total Number of Data Frames to be Taken    }
BytesPerFrame  = 4    ;  { Number of Bytes in Each Data Frame         }
FrmEl1         = $1D01 ; { Frame Element 1 - Read Address $101 & EOG  }
FrmEl2         = $0E09 ; { Frame Element 2 - Read Address $209 & EOG  }
FrmEL3         = $0F01 ; { Frame Element 3 - Read Address $301 & EOG  }
FrmEl4         = $0702 ; { Frame Element 4 - Read Address $302 & EOG & EOF }

PacCnt1        = 100  ;  { Pacer Counter 1 Value                      }
PacCnt2        = 2    ;  { Pacer Counter 2 Value                      }
DlyCnt         = 2    ;  { Delay Counter   Value                      }

DMAInitCode    = $0   ;  { DMA Initialization Code                    }
DMAEnableCode  = $38  ;  { DMA Enable Transfer Code                   }
DMASrcTrgCode  = $67  ;  { DMA Source/Trigger  Code - Pacer/EXTIN     }

Var

FrameByteCounter,
ByteCount             : Integer ;

{ WriteFrameElement -- writes contents of one frame element. }
Procedure WriteFrameElement(Element : Integer) ;
```

```
Begin  { WriteFrameElement }

Mem[CardSeg:FrameByteCounter] := Lo(Element) ;
  FrameByteCounter := FrameByteCounter + 1        ;
  Mem[CardSeg:FrameByteCounter] := Hi(Element) ;
  FrameByteCounter := FrameByteCounter + 1        ;

End ;  { WriteFrameElement }

Begin  { DMAExample }

{ ***** Figure 6, Block 101 ***** }

Port[PCDMABase] := Lo(BufferBase) ;
  Port[PCDMABase] := Hi(BufferBase) ;

{ ***** Figure 6, Block 102 ***** }

ByteCount := TotalFrames * BytesPerFrame ;

{ ***** Figure 6, Block 103 ***** }

Port[PCDMACount] := Lo(ByteCount) ;
  Port[PCDMACount] := Hi(ByteCount) ;

{ ***** Figure 6, Block 104 ***** }

Port[PCDMAMode] := XferMode ;

{ ***** Figure 6, Block 105 ***** }

FrameByteCounter := FrameMem ;
  WriteFrameElement(FrmEl1)      ;

{ ***** Figure 6, Block 106 ***** }

WriteFrameElement(FrmEl2)      ;

{ ***** Figure 6, Block 107 ***** }

WriteFrameElement(FrmEl3)      ;

{ ***** Figure 6, Block 108 ***** }

WriteFrameElement(FrmEl4)      ;

{ ***** Figure 6, Block 109 ***** }

Mem[CardSeg:PacDelCtrl]   := PacCnt1Mode2 ;
  Mem[CardSeg:PacDelCtrl]   := PacCnt2Mode2 ;

Mem[CardSeg:PacerCount1] := Lo(PacCnt1) ;
  Mem[CardSeg:PacerCount1] := Hi(PacCnt1) ;

Mem[CardSeg:PacerCount2] := Lo(PacCnt2) ;
  Mem[CardSeg:PacerCount2] := Hi(PacCnt2) ;

{ ***** Figure 6, Block 111 ***** }
```

```
Mem[CardSeq:PacDelCtrl]   := DelyCntMode0 ;

Mem[CardSeq:DelayCount]   := Lo(DlyCnt)   ;
Mem[CardSeq:DelayCount]   := Hi(DlyCnt)   ;

( ***** Figure 6, Block 110 ***** )

Mem[CardSeq:CardDMAMode]  := DMAInitCode  ;

( ***** Figure 6, Block 112 and 113 ***** )

Mem[CardSeq:CardDMASrcTrg] := DMASrcTrgCode ;

( ***** Figure 6, Block 116, 117, and 118 ***** )

Mem[CardSeq:CardDMAMode]  := DMAEnableCode ;

End.   ( DMAExample )
```

I claim:

1. A peripheral DMA controller for connection to a processor having a data base, and address bus, and an associated DMA controller having a DMA request input and a DMA acknowledge output, the peripheral DMA controller comprising in combination:
    (a) a peripheral data bus coupled to data terminals of a plurality of peripheral devices and a peripheral address bus coupled to address inputs of the peripheral devices;
    (b) a dual port memory storing in consecutive locations thereof a plurality of non-consecutive addresses of the peripheral devices and including a first address port coupled to the peripheral address bus, and a corresponding first data port coupled to the peripheral data bus, and also including a second address port and a corresponding second data port;
    (c) control circuit means for producing a plurality of DMA request signals on the DMA request input in response to a preselected event signal from one of the peripheral devices and for producing a plurality of corresponding DMA enable signals in response to a plurality of DMA acknowledge signals on the DMA acknowledge output;
    (d) means for coupling the data bus to the peripheral data bus in response to each DMA enable signal;
    (e) means for coupling the peripheral address bus to the second data port in response to each DMA enable signal and coupling the address bus to the peripheral address bus in response to absence of the DMA enable signal; and
    (f) an address counting circuit coupled to the second address port and applying an address to the second address port;
    (g) means for incrementing the address counting circuit in response to each DMA enable signal,
the peripheral DMA controller addressing the consecutive locations of the dual port memory in response to each DMA enable signal, respectively, and coupling the data bus to the peripheral data bus in response to each DMA enable signal, respectively, causing the dual port memory to sequentially output the non-consecutive addresses of the peripheral devices to effectuate direct transfer of data between the data bus and the peripheral devices, respectively.

2. The peripheral DMA controller of claim 1 wherein the control circuit means includes means for generating at least one transaction request signal in response to one of a plurality of preselected event signals, the control circuit means including means for generating each DMA request signal in response to a corresponding transaction request signal.

3. The peripheral DMA controller of claim 2 including address means coupled to the address bus for decoding part of an address produced by the processor to generate a first enable signal, the data bus coupling means coupling the data bus to the peripheral data bus in response to the first enable signal to enable the processor to access the dual port memory and the peripheral devices coupled to the peripheral data bus at times other than during the DMA enable signals.

4. The peripheral DMA controller of claim 1 wherein the associated DMA controller has only one channel coupled to the peripheral DMA controller.

5. The peripheral DMA controller of claim 1 wherein the dual port memory stores and end of frame flag bit in the last location in which any of the non-consecutive addresses are stored to indicate when a DMA transfer of a frame of data containing the non-consecutive addresses has been completed.

6. The peripheral DMA controller of claim 1 wherein the control circuit means is responsive to a terminal count signal produced by the associated DMA controller to terminate DMA transfer of data between the peripheral devices and the memory.

7. The peripheral DMA controller of claim 2 including means programmable by the processor for selecting each transaction request signal from one of the plurality of event signals.

8. The peripheral DMA controller of claim 2 including means for selecting a trigger source signal from among the plurality of event signals and means responsive to the trigger source select signal for precisely controlling the timing of a start signal and/or a stop signal, the control circuit means being responsive to the start signal and the stop signal for initiating and terminating a DMA transfer, respectively.

9. The peripheral DMA controller of claim 8 including programmable source event counter means responsive to the trigger source selecting means for counting a predetermined number of transaction request signals after a triggering event before generating the stop signal.

10. The peripheral DMA controller of claim 2 wherein the number of data conductors of the first data port is different than the number of data terminals of the second data port by a factor of two.

11. A method of effectuating a DMA transfer between a buffer memory and a plurality of peripheral devices having non-consecutive addresses, the method comprising the steps of:

(a) providing a dual port memory having a first address port and a corresponding first data port, and a second address port and a corresponding second data port;

(b) operating a processor to write a byte count number and a first address of the buffer memory into a DMA controller;

(c) writing the non-consecutive peripheral device addresses into consecutive locations, beginning with a first location, of the dual port memory by means of the first address port and the first data port;

(d) producing a request signal and transmitting it to the DMA controller;

(e) operating the DMA controller in response to the request signal to produce an acknowledge signal when a data bus is available;

(f) producing an enable signal in response to the acknowledge signal and applying an address of the first location to the second address port in response to the enable signal, and causing a peripheral address stored in that location to be output via the second data port to address inputs of the peripheral device;

(g) operating the DMA controller to output the first address to the buffer memory and effectuate transfer of a first byte of data between an addressed peripheral device and an addressed location of the buffer memory; and (h) repeating steps (e) through (g) for a next consecutive location of the dual port memory and the buffer memory.

12. The method of claim 11 including operating the processor for an instruction cycle between steps (g) and (h).

13. The method of claim 12 including operating the DMA controller to produce a termination signal when the number of bytes transferred between the buffer memory and the peripheral devices is equal to the byte count number, and terminating the DMA transfer operation in response to the termination signal.

14. The method of claim 12 wherein step (a) includes writing an end of frame bit into each of the consecutive locations of the dual port memory indicating whether that location is a last location in which any of the peripheral device addresses are stored are step (f) includes outputting the end of frame bit with the peripheral address stored in that location.

15. The method of claim 14 wherein step (d) includes producing a transaction request signal by selecting one of a plurality of event signals, producing a start signal and precisely controlling the timing of the start signal in response to any selected one of the event signals, and producing the request signal in response to a coincidence of the start signal and the transaction request signal.

16. The method of claim 15 wherein step (h) includes incrementing an address previously applied to the second address port.

17. The method of claim 15, including providing a data bus and an address bus each controllable by the processor and the DMA controller, a peripheral data bus coupled to data terminals of the peripheral devices, and to the first data port, and a peripheral address bus coupled to a plurality of address terminals of the peripheral devices and to the first address port, wherein step (c) includes coupling the data bus to the peripheral data bus, in response to the enable signal and coupling the address bus to the peripheral address bus in response to the enable signal, and operating the processor to access the first address port and the first data port by means of the peripheral address bus and the peripheral data bus, respectively.

18. The method of claim 17 including providing an address counter, coupled to the second address port, for storing addresses of locations of the dual port memory, step (f) including enabling the address counter to apply the memory address stored therein to the second address port in response to the enable signal.

19. The method of claim 18 wherein step (f) includes decoupling the address bus from the peripheral address bus in response to the enable signal and coupling the second data port to the peripheral address bus in response to the enable signal.

20. An apparatus for effectuating a DMA transfer between a buffer memory and a plurality of peripheral devices having non-consecutive addresses, the apparatus comprising:

(a) a dual port memory having a first address port and a corresponding first data port, and a second address port and a corresponding second data port;

(b) means for writing a byte count number and a first address of the buffer memory into a DMA controller;

(c) means for writing the non-consecutive peripheral device addresses into consecutive locations, beginning with a first location, of the dual port memory by means of the first address port and the first data port;

(d) means for producing a request signal and transmitting it to the DMA controller;

(e) means for operating the DMA controller in response to the request signal to produce an acknowledge signal when a data bus is available;

(f) means for producing an enable signal in response to the acknowledge signal and applying an address of the first location to the second address port in response to the enable signal, and means for causing a peripheral address stored in that location to be output via the second data port to address inputs of the peripheral device;

(g) means for operating the DMA controller to output the first address to the buffer memory and thereby effectuate transfer of a first byte of data between an addressed peripheral device and an addressed location of the buffer memory; and (h) means for incrementing the address applied to the second address port in response to the enable signal.

21. A peripheral DMA controller for connection to a processor having a data bus and an address bus, and to an associated DMA controller, the peripheral DMA controller comprising:

(a) a peripheral data bus coupled to data terminals of a plurality of peripheral devices and a peripheral address bus coupled to address inputs of the peripheral devices;

(b) a dual port memory storing in consecutive locations thereof a plurality of non-consecutive addresses of the peripheral devices and including a first address port coupled to the peripheral address bus, and a corresponding first data port coupled to the peripheral data bus, and also including a second address port and a corresponding second data port;

(c) means for writing the non-consecutive addresses into the consecutive locations by means of the first address port and the first data port;

(d) control circuit means for transmitting a request signal to the associated DMA controller, receiving a responding acknowledge signal therefrom, and producing an enable signal having first and second levels in response to the acknowledge signal;

(e) means for coupling and decoupling the data bus to and from the peripheral data bus in response to the first and second levels, respectively, and coupling and decoupling the address bus from the peripheral address bus in response to the first and second levels, respectively; and (f) means for accessing the consecutive locations of the dual port memory by means of the second address port in response to each of a plurality of the enable signals, respectively, to cause the dual port memory to sequentially output the non-consecutive addresses through the second data port to the peripheral devices.

22. An apparatus for effectuating a DMA transfer between a buffer memory and a plurality of peripheral devices having non-consecutive addresses, the apparatus comprising:

(a) a dual port memory storing in consecutive locations thereof a plurality of non-consecutive addresses of the peripheral devices and including a first address port coupled to a peripheral address bus, and a corresponding first data port coupled to a peripheral data bus, and also including a second address port and a corresponding second data port;

(b) means for writing a byte count number and a first address of the buffer memory into a DMA controller;

(c) means for writing the non-consecutive peripheral device addresses into consecutive locations of the dual port memory by means of the first address port and the first data port;

(d) means for producing a request signal and transmitting it to the DMA controller, the DMA controller producing a responsive acknowledge signal;

(e) means for producing an enable signal in response to the acknowledge signal;

(f) means responsive to the enable signal for accessing a next consecutive location of the dual port memory by means of the second address port and causing the dual port memory to output the peripheral device address in that location by means of the second data port;

(g) means for coupling address inputs of the peripheral devices to receive the peripheral address output by the dual port memory and coupling a plurality of data terminals of the peripheral devices to data terminals of the buffer memory in response to the enable signal; and (h) means for operating the DMA controller to access a location of the buffer memory and thereby effectuate transfer of a byte of data between an addressed peripheral device and an addressed location of the buffer memory.

* * * * *